May 20, 1958
H. OBERTHÜR
2,835,271
PRESSURE REGULATOR
Filed Oct. 3, 1955
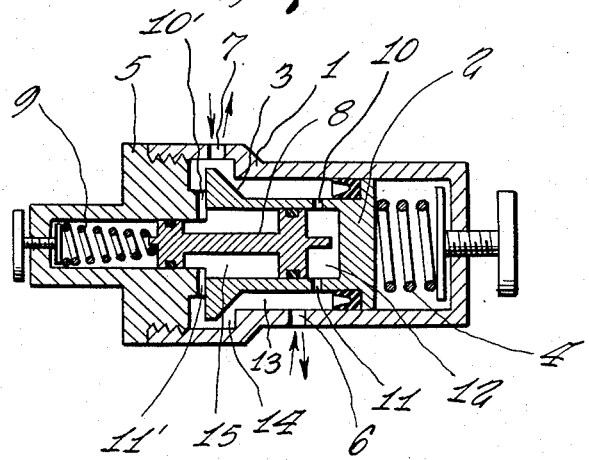
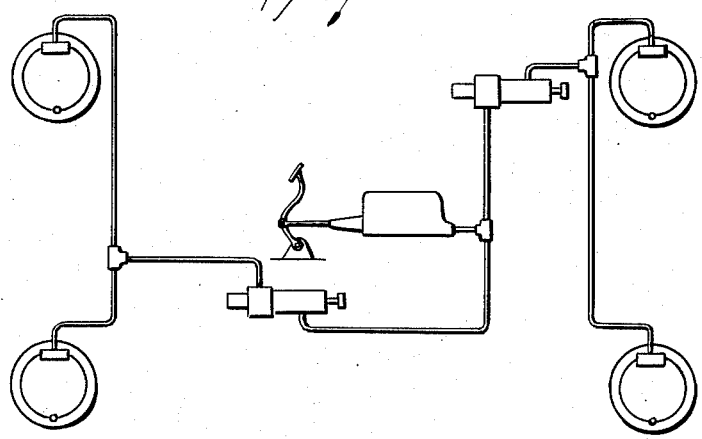
INVENTOR.
HEINRICH OBERTHÜR United States Patent Office 2,835,271
Patented May 20, 1958

2,835,271

PRESSURE REGULATOR

Heinrich Oberthür, Offenbach (Main), Germany, assignor to Alfred Teves Maschinen- und Armaturenfabrik K. G., Frankfurt am Main, Germany Application October 3, 1955, Serial No. 538,194

Claims priority, application Germany October 6, 1954

4 Claims. (Cl. 137—505.13)

The invention relates to a pressure regulator, in particular for automotive brakes. According to the invention, a pressure regulator is proposed one end of whose housing forms a seat for a valve piston displaceable against spring action, in which piston a differential piston is displaceably mounted, the piston being backed up by a spring and subjected to pressure acting in the annular spaces formed by it and the housing, via openings in the valve piston itself or in the housing.

The device according to the inventon will now be more fully described with reference to the accompanying drawings, but it should be understood that these are given by way of illustration and not of limitation and that many changes in the details may be made without departing from the spirit of the invention.

In the drawings,

Fig. 1 shows a sectional view of an embodiment of the invention;

Fig. 2 shows the same embodiment, in schematic form, installed in an automotive vehicle.

Referring to Fig. 1, the housing 1 is fitted with a hollow sliding valve piston 2. The latter is formed with a conical surface at 3 for which the housing forms a seat. The valve piston 2 is backed up by a spring 4 against housing 1. A part 5 screwed into the housing serves as a stop for the valve seat end of the piston, and restricts its displaceability. The housing is provided with openings 6 and 7 for the connection of lines leading to input and output units. The bore in the valve piston 2 is opposite another in part 5. These bore contain a differential piston 8, backed up by a spring 9 against part 5. Openings 10 and 11 place chamber 12 in communication with the annular space 13, and openings 10' and 11' place chamber 15 in communication with annular space 14. When the piston is in the position of rest, there is a communication between annular spaces 13 and 14. Upon displacement of the valve piston against the action of spring 4, the valve end 3 is seated and shuts off the connection between annular spaces 13 and 14. In the course of this displacement, the valve piston is lifted off the stop. Both spring 9 and spring 4 can be manually prestressed from the outside by means of adjusting screws.

The pressure regulator according to the invention possesses the advantage in that it can be used without any changes either as a pressure-augmenting or as a pressure-reducing valve. It is only necessary to interchange the connections to openings 6 and 7, the regulator acting as a step-up valve when opening 6 is connected to the input line and opening 7 to the output line. With these connections reversed, the pressure regulator acts as a step-down valve.

The mode of operation of the regulator according to the invention will now be described first as a pressure-reducing valve. As the input pressure rises, after the point of operation is reached, namely the point at which the force exerted on the valve piston 2 by the source is greater than the opposing spring action, the valve piston is displaced against the action of that spring. The valve seat end 3 of piston 2 is seated against the housing 1 and divides annular space 13 from annular space 14. In the course of displacement, the valve piston withdraws from the stop provided by part 5, so that upon further increase of input pressure the pressure medium will reach chamber 15 not only through openings 10' and 11' but also through the opening formed by displacement of the valve piston. The effective annular piston area affected by the pressure medium upon increase of input pressure is smaller than the piston area facing chamber 12, so that there is a step-down of pressure from chamber 15 to chamber 12. The pressure acting in annular space 14 and chamber 15 is therefore always higher than the pressure exerted in chamber 12 and annular space 13 and therefore upon the output. The result is a relationship between input and output pressure such that the latter at first varies proportionally to the former, but after passing the point of actuation the output pressure increases only slightly with increased input pressure.

The regulator hooked up as a pressure-augmenting valve differs in that the input line is connected to opening 6 and the output line to opening 7. When the point of actuation is passed, the input pressure now acts on the face of the piston. There is therefore a step-up of pressure from chamber 12 to chamber 15.

The device according to the invention is especially advantageous for purposes of laying out a brake system according to the ideal calculated force distribution. It is not sufficient either to install a pressure step-up in the line leading to the front wheel brake cylinders or a pressure-reducing valve in the line leading to the rear wheel brake cylinders in order to equalize the dynamic axle load displacement. Proportionality between pedal force and the sum of braking forces cannot be attained in such a manner. With the device according to the invention, it is possible to have the same pressure regulator in the lines to both the front wheel and the rear wheel brake cylinders, except with the connections suitably reversed. Fig. 2 illustrates schematically the regulators installed in a brake system.

Further, by suitable arrangement, the pressure regulator may be installed in the line leading to a trailer brake system to regulate its brake pressure. For if the tractor pressure is adjusted by pressure regulators, it also becomes necessary to regulate the trailer brake pressure, so that the deceleration of the tractor will match that of the trailer, and the towing stress will be approximately zero.

What I claim is:

1. A pressure regulator, in particular for automotive brakes, comprising a housing, a control piston in said housing, said control piston having a first end and a second end spaced from the first end, the first end of said piston being slidably disposed in a bore in one end of said housing and the second end of said piston forming an annular valve head, the other end of said housing forming a seat for said valve head, a differential piston having one piston head displaceably mounted in a bore in said control piston and another piston head displaceably mounted in a bore in said other end of said housing, said differential piston being backed up by a spring operative against said other end of the housing, said first end of said control piston being backed up by a second spring operative against said one end of said housing, said housing and said control piston forming annular spaces of different diameter in said housing, inlet and outlet means in said housing, communicating said annular spaces respectively, said differential piston being subjected on the two sides thereof to different pressures prevailing in the annular spaces via openings in the control piston and the housing, in dependence upon the position of said control piston in said housing.

2. A pressure regulator according to claim 1, wherein said other end of said housing consists of an inner screw-threaded opening and a mating screw threaded stop element for restricting the displacement of said control piston.

3. A pressure regulator according to claim 1, including means for manually adjusting both said backing springs from the outside of said housing.

4. A pressure regulator according to claim 1, wherein the diameter of said one piston head of said differential piston disposed in said bore of the control piston is greater than the diameter of said other piston head of said differential piston, which is disposed in said other end of said housing.

References Cited in the file of this patent

UNITED STATES PATENTS

| | | |
|---|---|---|
| 2,144,020 | Hunt | Jan. 17, 1939 |
| 2,351,953 | Goepfrich | June 20, 1944 |
| 2,367,115 | Goepfrich | Jan. 9, 1945 |
| 2,526,968 | Ponturs | Oct. 24, 1950 |